United States Patent
Huhtasalo et al.

(10) Patent No.: US 9,922,215 B2
(45) Date of Patent: Mar. 20, 2018

(54) METHOD FOR RETRIEVING A SHUT STATE AND/OR A LOCATION OF A CLOSABLE CONTAINER

(71) Applicant: Smartrac Investment B.V., Amsterdam (NL)

(72) Inventors: Lauri Johannes Huhtasalo, Bangkok (TH); Joerg Stefan Wittkowski, Kamp-Lintfort (DE)

(73) Assignee: SMARTRAC INVESTMENT B.V., Amsterdam (NL)

( * ) Notice: Subject to any disclaimer, the term of this patent is extended or adjusted under 35 U.S.C. 154(b) by 0 days.

(21) Appl. No.: 15/537,157

(22) PCT Filed: Dec. 17, 2015

(86) PCT No.: PCT/EP2015/080197
§ 371 (c)(1),
(2) Date: Jun. 16, 2017

(87) PCT Pub. No.: WO2016/102294
PCT Pub. Date: Jun. 30, 2016

(65) Prior Publication Data
US 2017/0364716 A1 Dec. 21, 2017

(30) Foreign Application Priority Data
Dec. 22, 2014 (EP) .................................. 14199578

(51) Int. Cl.
*G06K 7/08* (2006.01)
*G06K 7/10* (2006.01)
(Continued)

(52) U.S. Cl.
CPC ....... *G06K 7/10297* (2013.01); *B65D 5/0254* (2013.01); *B65D 5/4233* (2013.01); *B65D 5/6602* (2013.01); *G06K 19/07794* (2013.01)

(58) Field of Classification Search
CPC ......... G06K 7/10297; G06K 19/07794; G06K 7/0008; G06K 13/08; G06F 3/1454; B65D 5/4233; B65D 5/6602
(Continued)

(56) References Cited

U.S. PATENT DOCUMENTS

2004/0005418 A1  1/2004 Schmid et al.
2005/0162277 A1  7/2005 Teplitxky et al.
(Continued)

FOREIGN PATENT DOCUMENTS

EP  1375131 A1  1/2004
EP  3038020 A1  6/2016
JP  2010 263404 A  11/2010

OTHER PUBLICATIONS

PCT International Preliminary Report on Patentability, PCT/EP2015/080197, dated Jun. 27, 2017.
(Continued)

*Primary Examiner* — Karl D Frech
(74) *Attorney, Agent, or Firm* — Quarles & Brady LLP

(57) ABSTRACT

The invention relates to a method for retrieving a shut state and/or a location of a closable container as well as closable containers, wherein a transition between an open position and a closed position is achieved by a relative movement at least of a first container part with respect to a second container part, wherein the container has at least one RFID chip having a connected near field antenna and a far field antenna and the RFID chip having the connected near field antenna is arranged at the first or at the second container part and the far field antenna is arranged at the other one of the first and second container part, respectively, and the near field antenna, which is connected to the RFID chip, is arranged, as compared to the far field antenna, such that, in the closed position of the container, a noncontact electromagnetic coupling takes place between the near field
(Continued)

antenna and the far field antenna. In the context of the method, due to the interaction of a sending unit and a receiving unit, a response signal can by generated by means of the RFID chip and can be transmitted, the range of said response signal depending on the shut position of the container.

6 Claims, 4 Drawing Sheets

(51) Int. Cl.
      *G06K 19/077*     (2006.01)
      *B65D 5/02*     (2006.01)
      *B65D 5/42*     (2006.01)
      *B65D 5/66*     (2006.01)

(58) Field of Classification Search
      USPC ................... 235/451, 439, 449, 492, 375
      See application file for complete search history.

(56) References Cited

U.S. PATENT DOCUMENTS

| | | |
|---|---|---|
| 2005/0210658 A1 | 9/2005 | Schmid et al. |
| 2008/0309495 A1 | 12/2008 | Chisholm |
| 2011/0254665 A1* | 10/2011 | Lindsay ............ G06K 19/0717 340/10.5 |
| 2013/0008087 A1* | 1/2013 | Paavilainen ............ G09F 3/03 49/13 |
| 2014/0183266 A1* | 7/2014 | Lee ....................... B65D 90/00 235/492 |

OTHER PUBLICATIONS

International Search Report and Written Opinion dated Feb. 18, 2016 in connection with PCT/EP2015/080197.

Search Report dated Mar. 29, 2015 in connection with EP Application 14 191 9578 [now EP Patent 3038020].

* cited by examiner

METHOD FOR RETRIEVING A SHUT STATE AND/OR A LOCATION OF A CLOSABLE CONTAINER

CROSS-REFERENCE TO RELATED APPLICATIONS

This application represents the national stage entry of PCT International Application No. PCT/EP2015/080197 filed on Dec. 17, 2015, which claims the benefit of European Patent Application No. 14199578.7 filed on Dec. 22, 2014, the entire contents of which are incorporated herein by reference for all purposes.

The invention relates to a method for retrieving the shut state and/or the location of a closable container and to a container of this kind.

From the state of the art, generic containers are known as outer packaging for goods, for example. The known containers are provided with an RFID chip and with an antenna connected thereto, allowing signals and energy in the radio-frequency range to be received via the antenna, the received energy being used to generate a corresponding response signal by means of the RFID chip, and said response signal allowing bidirectional communication with a read/write device. In common technologies, the antennas are tuned to the RFID chips in such a manner that communication with a read/write device is possible in specific frequency ranges in each case, such as in the ultrahigh frequency range or in the microwave frequency range (UHF or SF frequency range). The combination of an RFID chip and an antenna is commonly called an RFID tag or an RFID transponder, RFID standing for radio frequency identification.

In generic methods, containers of this kind are used together with external read/write devices, also known as sending and/or receiving units. Usually, the sending unit generates and sends out a signal which is received by the corresponding antennas of the containers, whereupon a corresponding response signal is generated. These response signals of the containers or, more precisely, of the antennas connected to the containers are received by corresponding receiving units and are processed as required.

Corresponding containers and methods using containers of this kind are suitable for theft protection of items, for example. Just as well, the known containers and the corresponding methods can also be used in the logistical field or in other fields in order to determine the location of the container or passage of a certain area by the container by correspondingly positioning the sending and/or receiving units.

However, the known devices and methods are disadvantageous in that while they are capable of determining or at least narrowing down the location of the corresponding container, they do not provide any information regarding the state of the container. Still, closable containers are employed in very many applications where not only the location of the container but also the shut state and a distinction between an open position and a closed position of the container and the repeated transition between the two states is of particular interest for handling and use of the goods and items stored in the respective containers as well as for the implementation of the methods outlined above. This applies, for example but not exclusively, to containers in which perishable goods and items or goods and items of otherwise limited storage life are stored and to containers that are supposed to function not only as packaging but also as theft protection.

In the field of theft protection, it is known practice, moreover, not to equip the packaging or the container in which an item is located with a corresponding RFID chip including an antenna, but to apply the RFID tag to the item directly. However, this has the disadvantage that security devices are easily visible and, additionally, that the desire for easy removal of the tags after purchase clashes with the desire for difficult removal of the tag prior to an intended theft. Furthermore, the visual appearance of the product is adversely affected by the application of RFID chips and of the connected antennas to the item itself.

Therefore, the object of the present invention is to enhance the generic containers and the known methods in such a manner that not only the location but also the repeatedly changeable shut position can be detected easily and reliably by means of the containers and by means of their use in corresponding methods.

The basic idea of the closable containers according to the invention envisages for the RFID chip having a connected first antenna, hereinafter referred to as a near field antenna, to be arranged at a first container part or at a second container part and for a second antenna, hereinafter referred to as a far field antenna, to be additionally connected to the other one of the first and second container part, wherein the first container part and the second container part are arranged relative to each other at the container in such a manner that the container parts undergo a relative movement with respect to each other when the container is opened and closed, i.e. during transition from an open position into a closed position and vice-versa. The RFID chip having the connected near field antenna and the far field antenna are arranged on the respective container parts in such a manner that a noncontact electromagnetic coupling takes place between the near field antenna and the far field antenna in the closed position of the container. The noncontact electromagnetic coupling can be achieved, for example, by way of capacitive coupling, inductive coupling or mixed capacitive and inductive coupling.

By arranging the device features according to the invention, a significant improvement of the range of communication with at least one sending and/or receiving unit is achieved in the closed position of the container and in the resulting noncontact electromagnetic coupling between the near field antenna and the far field antenna. In other words, this means that the far field antenna acts as a "range improver" or booster, but only if the spatial arrangement relative to a near field antenna connected to the RFID chip is such that a noncontact electromagnetic coupling is ensured. Thus, the proposed container allows a distinction, dependent on the range of communication with at least one sending and/or receiving unit, of the shut position of the container. Likewise, range adjustment can be achieved via the type, size and design of the electromagnetically coupling far field antenna.

It is particularly advantageous that the interaction, i.e. the noncontact electromagnetic coupling between the far field antenna and the near field antenna can be produced and terminated or interrupted repeatedly. This means that not only a first opening of the container but also a subsequent closing and, correspondingly, any subsequent opening and closing actions will each produce or terminate the noncontact electromagnetic coupling of the far field antenna and of the near field antenna. It is particularly advantageous if the first container part is designed as a body and the second container part is designed as a lid of the container. Alternatively, it may be additionally envisaged for the first and second container parts to be two complementary lock elements of the container. For instance, butterfly locks, bolt locks, (turning) latch locks and comparable locks each have two complementary lock elements that, when they are used correspondingly on closable containers as envisaged by the proposed teaching, move relative to each other during transition between the open position and the closed position of the container and furthermore secure and maintain in particular the closed position of the container by mechanical means. This offers the particular advantage that container parts of this kind take up a well-defined position relative to each other especially in the closed position, thus allowing the noncontact electromagnetic coupling between the near field antenna and the far field antenna to be produced or brought about in a secure and reliable manner.

Furthermore, it is also advantageous if, additionally or alternatively, a corresponding container has guide means which predetermine the possible relative movement of the container parts upon transition between the closed position and the open position or at least the relative arrangement of the container parts in the closed position. In this way, the relative arrangement between the near field antenna and the far field antenna, which is required for producing the noncontact electromagnetic coupling, can also be ensured more reliably in the closed position of the container.

Moreover, it is particularly desirable for the container to consist of paper, cardboard or of a composite material comprising at least paper and/or cardboard. Both the envisaged RFID chips having the connected near field antennas and the far field antennas can be applied to or even introduced into containers of this kind particularly well. Furthermore, material of this kind is particularly suitable because in many fields it is used as outer packaging of high-quality and small goods in some instances, for which retrieval or monitoring of a shut position of the container in addition to determination of location is of particular interest in the context of effective theft protection.

Moreover, it is particularly desirable for this container material or other container material that the far field antenna and/or the near field antenna is/are arranged on the container part(s) as a result of a printing process. By means of printing methods known per-se, such as methods using electrically conductive printing pastes, antennas can be arranged quickly and reliably on the container parts.

Additionally, a particularly advantageous container design can be achieved if one of the two container parts has a tab or is even realized as a tab. For example, insert tabs, which may themselves in turn be secured or penetrated by other tabs, are especially common in outer packaging. A particular advantage of tabs of this kind is that upon transition between the open position and the closed position of the container, the tabs take up a well-defined position with respect to the other container parts. This is particularly true for the closed position of the container. Thus, positioning of the RFID chip having the connected near field antenna or of the far field antenna at, on, or in such a tab allows the necessary precision in the relative arrangement of the near field antenna with respect to the far field antenna to be easily and safely ensured in the closed position of the container.

Other particularly advantageous properties of the proposed containers are realized if the RFID chip having the connected near field antenna and the far field antenna are connected with the first container part and with the second container part, respectively, in such a manner that they are arranged in the interior of the container when the container is in the closed position. On the one hand, this allows the far field antenna and the near field antenna connected to the RFID chip to not be visible at the exterior of the container, which is particularly advantageous in the context of the containers being used for theft protection. On the other hand, this also ensures that the far field antenna, the near field antenna and the RFID chip will not be damaged by mechanical or other external influences when the containers are used in the customary manner.

Moreover, the above-mentioned object is attained by a method for retrieving a shut position of at least one closable container, which comprises the following method steps: sending a signal by means of at least one sending unit; receiving the signal by means of a near field antenna on a first or second container part of the container, said antenna being connected to an RFID chip; generating a response signal by means of the RFID chip; transmitting the response signal to at least one receiving unit, wherein, in a closed position of the container, a noncontact electromagnetic coupling exists between the near field antenna of the RFID chip and a far field antenna arranged at the other one of the first and second container part, and wherein the response signal is transmitted with a first range by the far field antenna so as to communicate with a sending unit and wherein, in an open position of the container, the response signal is transmitted with a second range by the near field antenna connected to the RFID chip so as to communicate with a sending unit; and subsequently monitoring by means of at least one receiving unit if response signals are received.

The proposed method ensures that the receipt of response signals for each individual receiving unit depends both on the spatial position of the container and on the shut position of the container, which predetermines the range of the response signal. Consequently, the movement and the location of the containers can be retrieved and their shut position can be determined by means of an arrangement of multiple receiving units that is advantageously adjusted in each case.

The method can be performed in a particularly advantageous manner if the above-mentioned method steps are periodically or uninterruptedly repeated, any temporal change in the response signals being detected and in particular stored in particular by means of a data processing installation at least connected to a receiving unit.

It is particularly desirable for the method that the response signals generated by the RFID chip are generated as characteristic response signals of a respective container or of at least one respective container type. This can be ensured by a corresponding design of the RFID chip both in terms of the hardware and by corresponding programming. Individualization of the response signals facilitates or allows the unambiguous association of response signals at the respective receiving unit(s) with one container or one container class and thus facilitates detection of the temporal change in the response signals and their storage.

Moreover, the method according to the invention can be enhanced in particular by having the data processing installation evaluate the temporal change in the response signals and form a prognosis regarding the location and/or the shut position of the at least one container for a current and/or future point in time based on said evaluation.

An enhancement of this kind can also be closely linked with the position of the receiving units, which is adjusted to the respective containers and to the corresponding environment. Also, the design is made possible by the fact that in addition to the corresponding arrangement of receiving units, algorithms are employed on the data processing installation that process the received response signals and determine with correspondingly high probability or even with certainty whether a container is changing, has changed, or is probably going to change its location and whether the corresponding container has been opened or closed, is being opened or closed or is probably going to be opened or closed at the same time or without change of location.

Furthermore, the method can also be implemented in such a manner that the retrieval and/or prognosis regarding the location or the shut position of the at least one container is output via an output unit of the data processing installation. Thus, a user or operator of the corresponding method will be informed in a simple manner, such as optically or acoustically, about the current or future change of the shut position or of the location of the container(s).

An additional enhancement of the method provides for the signals to be sent and for the response signals to be received by means of at least one combined sending and receiving unit. In this way, the method can be carried out with a reduced number of required installations and devices.

Furthermore, it may be advantageously envisaged for the response signals having the first range to achieve a larger range than the response signals having the second range. The corresponding range adjustment has several advantages. For one, the RFID chip can have a more simple design because there is no need to generate different response signals as a function of the shut position of the container; instead, only one uniform response signal has to be generated and transmitted accordingly.

Furthermore, the differing range can allow for a particularly advantageous and strategic placement of receiving units, such as in places or environments in which a change in the shut position, i.e. opening or closing, is expected or is especially critical. For example, it may be envisaged for the range of the response signal to be about 5 to 10 meters if it is transmitted via the far field antenna and the container is correspondingly in a closed position. For an open position of the container and a resulting transmission of the response signal by means of the near field antenna connected to the RFID chip, it may be envisaged that a range of less than 1 meter is achieved.

In very general terms, it may be advantageously provided for the difference between the ranges to amount to a factor of 5 to 100 as a function of the shut position of the container. The respective adjustment of the ratio between the ranges highly depends on the containers used in each case and on the purpose and the environment in which the corresponding containers are used and their location and/or shut position is supposed to be retrieved or predicted.

Hereinafter, individual embodiments of the present invention will be explained by way of example with the aid of merely schematic drawings.

Figure 4A:
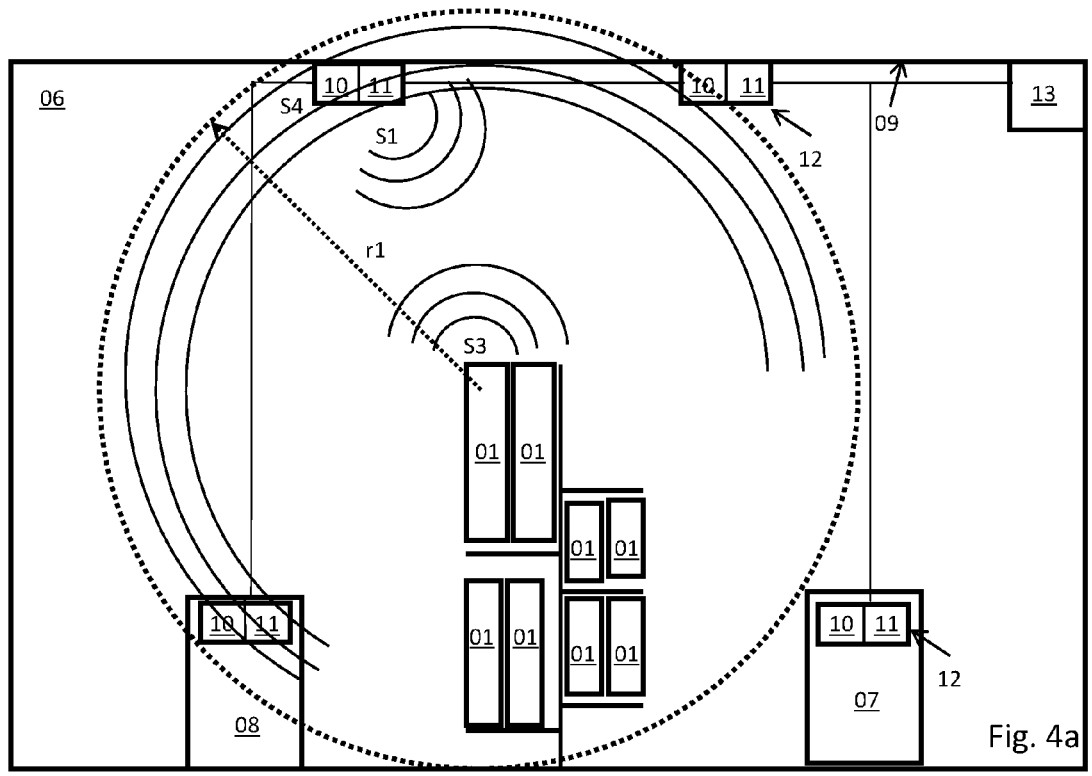
Figure 4B:
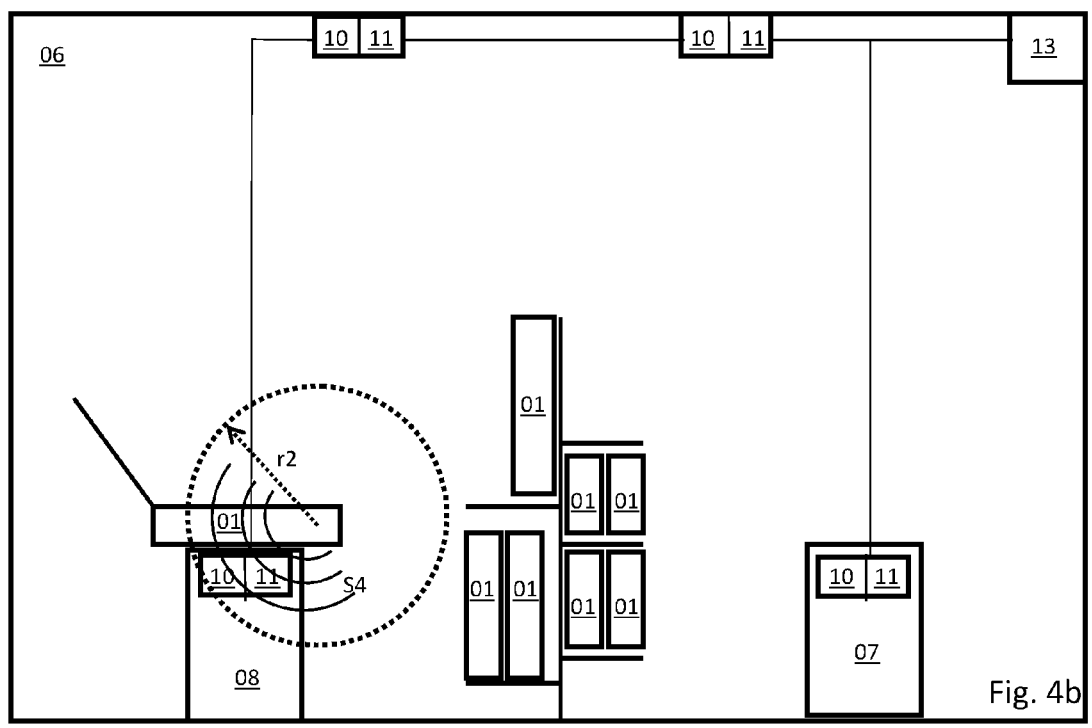
Figure 4C:
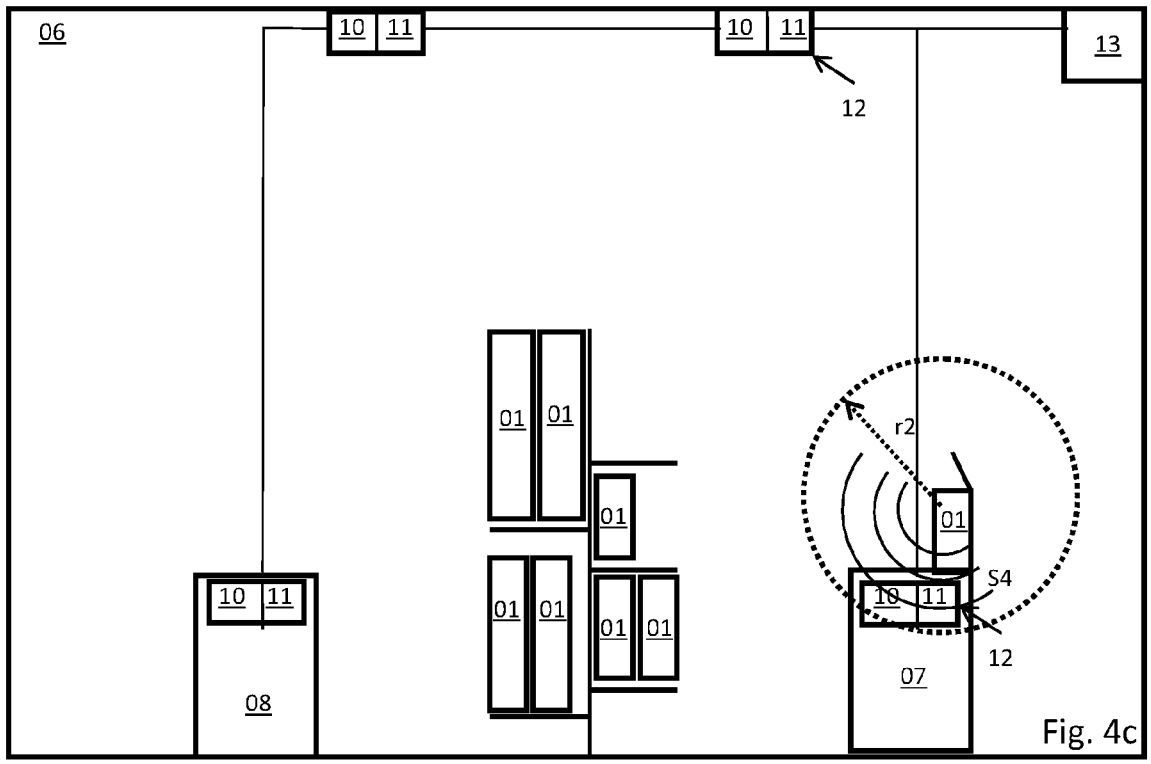
Figure 4D:
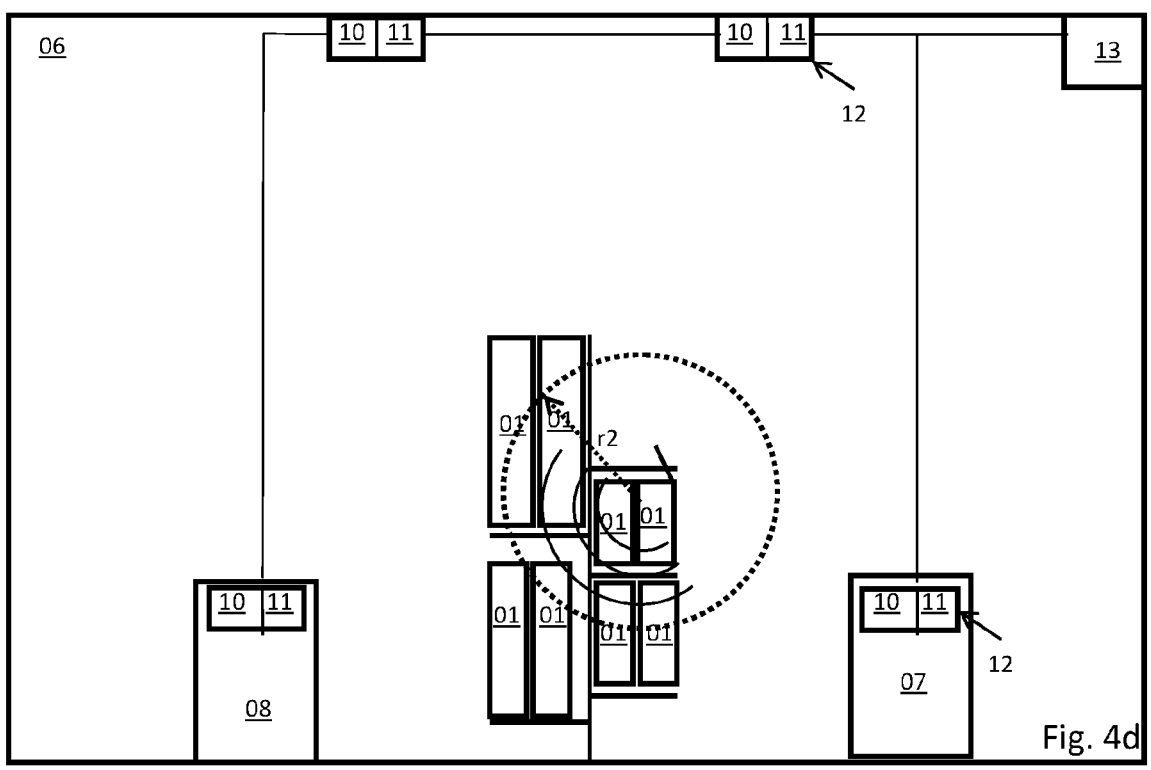

FIG. 4*a* shows an exemplary application of the containers according to the invention and of the method according to the invention in a first situation, FIG. 4*b* shows an exemplary application of the containers according to the invention and of the method according to the invention in an exemplary modified second situation, FIG. 4*c* shows an exemplary application of the containers according to the invention and of the method according to the invention in another exemplary modified third situation; and FIG. 4*d* shows an exemplary application of the containers according to the invention and of the method according to the invention in another exemplary modified fourth situation.

Figure 1:
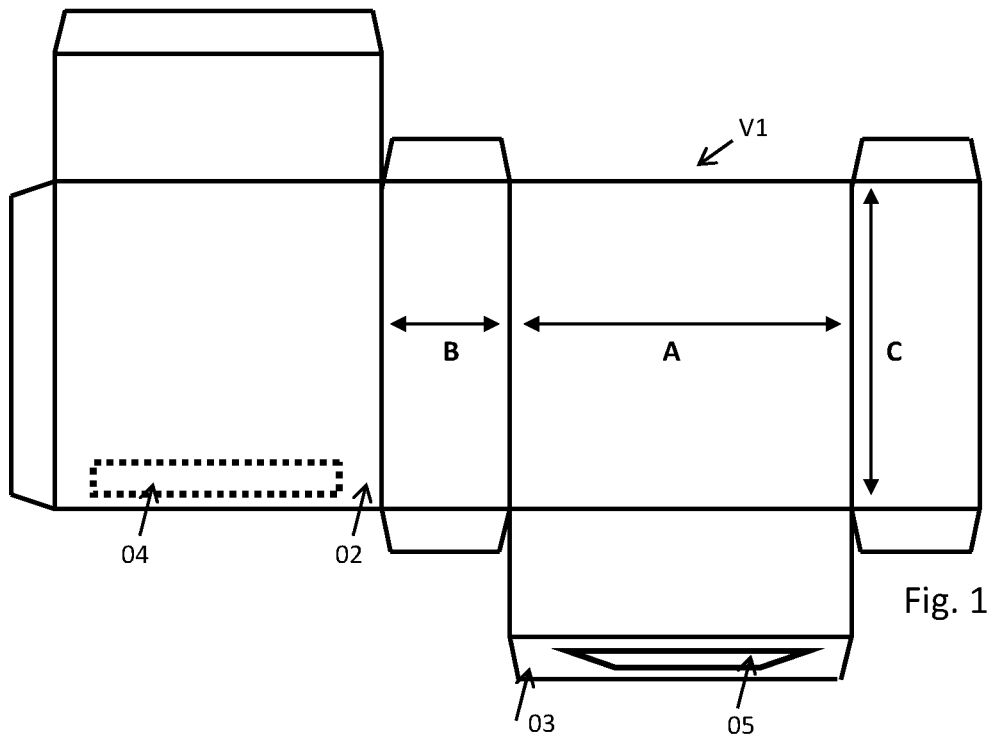
FIG. 1 shows a precursor of a container according to the invention.

For a clearer illustration of the containers according to the invention, FIG. 1 shows a precursor V1 of a container. The precursor V1 can consist of cardboard or of a composite material comprising cardboard, for example. The precursor V1 can be deformed with or without the use of corresponding adhesive agents in such a manner that a container is produced that has the shape of a cuboid having the dimensions A×B×C, a part of the precursor V1 forming a first container part 02 and another part forming a second container part 03. As is visible already in FIG. 1, a near field antenna and a RFID chip 04 connected thereto are formed on the part of the precursor V1 that forms the first container part 02. The dotted illustration in FIG. 1 indicates that the near field antenna and the connected RFID chip 04 are arranged on the underside (not illustrated) of the precursor V1 or alternatively in the material of the precursor V1. Moreover, the near field antenna can be arranged or placed on the precursor V1 by means of a printing process.

As furthermore illustrated in FIG. 1, the second container part 03 is realized as a tab, and in the area of the second container part 03 a far field antenna 05 is connected to the second container part 03.

Figure 2:
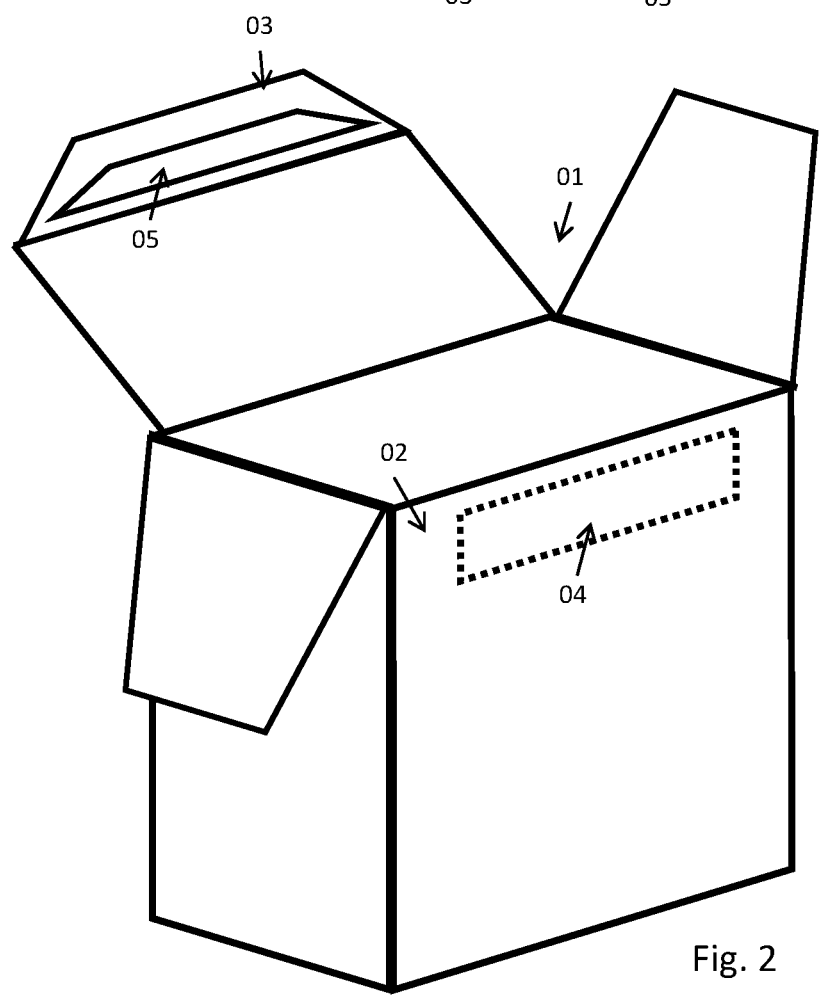
FIG. 2 shows a container according to the invention in an open position.

The container illustrated in FIG. 2 substantially corresponds to the result after formation of the precursor V1 of FIG. 1, but in an open position. Correspondingly, on an inner side of the container 01, the container 01 has an RFID chip arranged on the first container part 02 and a near field antenna 04 connected to the RFID chip, the arrangement on the inside being illustrated by the dots as in FIG. 1. Moreover, the far field antenna 05 is illustrated, too, which is arranged on the second container part 03 of the container 01. As is visible in FIG. 2, transition of the container 01 from the illustrated open position into the closed position not illustrated requires a relative movement of the first container part 02 with respect to the second container part 03. The same is true vice-versa for the transition from the closed position of the container 01 into the open position.

As is also easily visible from FIG. 2, the second container part 03 comes to rest plane-parallel, in the broadest sense, to the plane of the first container part 02 when the container 01 is brought into the closed position. This is particularly true if corresponding goods or the like are contained in the container 01. Aside from the substantially parallel arrangement of the two container parts, the far field antenna 05 and the RFID chip and the connected near field antenna 04 are arranged on the then opposite container parts 03 and 02 in such a manner that the near field antenna and the far field antenna 05 arrive at such a narrow spatial distance and simultaneously at such a well-defined relative position with respect to each other when the container 01 arrives in the closed position that a noncontact electromagnetic coupling in the form of a capacitive coupling or in the form of an inductive coupling is established. To this end, the respective capacitive and/or inductive properties of the near field antenna and of the far field antenna 05 are tuned to each other in a way that allows a coupling to form in the first place and to be maintained.

The far field antenna 05 may be arranged on the second container part 03 in such a manner that the far field antenna is located within the container 01 when the container 01 is in the closed position. Notwithstanding the arrangement of the far field antenna 05 on the second container part 03 and the arrangement of the RFID chip and of the connected near field antenna 04 on the first container part 02 as illustrated in FIG. 2, a reverse or switched arrangement on the respective container parts is possible as well.

Figure 3:
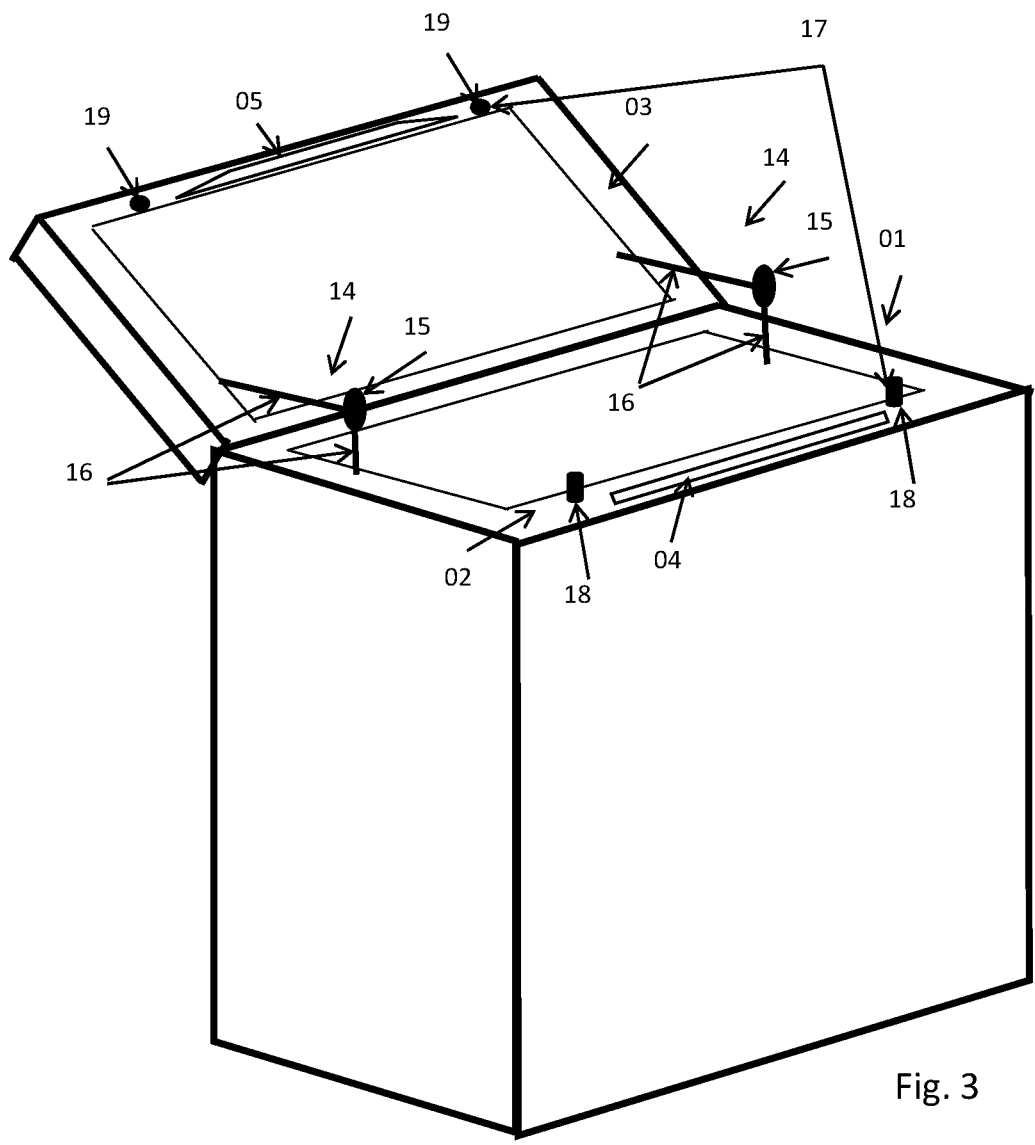
FIG. 3 shows a container according to the invention including guide means.

FIG. 3 shows an embodiment of a corresponding container 01 modified in relation to FIG. 2. The two container parts 03, 02 are additionally connected to each other via the guide means 14. Each guide means 14 has a revolute joint 15 and two guide bars 16, which extend radially to the center of revolution at the respective sides of the revolute joint 15 and which, in turn, are mounted to revolve at the first container part 02 and at the second container part 03. The guide means 14 provide guidance for the container parts 02, 03 when the container 01 transitions between the open position and the closed position because they limit or predefine the possible relative movement of the container parts 02, 03. For this purpose, the revolute joint 15 and the revolving arrangement of the guide bars 16 on the container parts can also be equipped with corresponding stops (not illustrated in FIG. 3), for example, which further limit the relative movement of the container parts 02, 03. Moreover, FIG. 3 shows an additional pair of guide means 17, each of which has a lug 18 on the first container part 02 and an associated recess 19 of corresponding dimensions in the second container part 03. When the container 01 ultimately transitions into the closed position, the respective lug 18 engages into the recess 19 and thus defines the relative position of the first container part 02 to the second container part 03. The guide means 14, 17, as illustrated by way of example in FIG. 3, thus support the precise alignment between the first and second container parts 02, 03 in the closed position that is required for establishing and maintaining the noncontact electromagnetic coupling.

FIG. 4a shows, as an example, sales or retail premises 06 in which a plurality of products is displayed or offered in corresponding containers according to the invention. Moreover, there is a checkout area including a cash register 07 and a service or helpdesk area including a corresponding service counter or helpdesk 08 in the premises 06.

Moreover, two sending units 10 and two receiving units 11 are arranged in the ceiling area 09 in the premises 06, one sending unit 10 and one receiving unit 11 being realized as a combined sending and receiving unit 12 in each case. At the same time, combined sending and receiving units 12 are arranged in the area of the cash register 07 and in the area of the service counter or helpdesk 08, as well. Each of the total of four sending and receiving units 12 is connected to a data processing installation 13. As illustrated in FIG. 4a, all the containers 01 according to the invention are in the closed position and are arranged in a shelf in the sales premises 06.

Hereinafter, the course of the method according to the invention will be schematically outlined with respect to only a single one of the containers 01 according to the invention illustrated in FIG. 4a. In a first method step S1, one of the two combined sending and receiving units 12 arranged in the ceiling area 09, for example, sends a signal. In the subsequent method step (not illustrated), the near field antenna connected to the RFID chip of a container 01 according to the invention receives the signal. In another method step S3, the far field antenna of the container 01 transmits a response signal having a first range r1 in the sales premises 06 in the example illustrated in FIG. 4a. In another method step S4, all combined sending and receiving units 12 that are remote from the container 01 according to the invention within a radius of range r1 receive the corresponding response signal. In the example of FIG. 4a, the response signal is received by all combined sending and receiving units 12 except for the sending and receiving unit 12 in the area of the cash register 07. The corresponding receipt of the response signal is communicated between the combined sending and receiving units 12 and the data processing installation 13 and is processed accordingly.

The illustration of FIG. 4a clearly shows that a corresponding change of the location of one or more of the containers 01 would result in a corresponding change in terms of the receipt of the response signals for the respective combined sending and receiving units 12, thus allowing permanent retrieval of and potentially a forward-looking prognosis as to the location of the containers 01 in particular in case of repeated or uninterruptedly repeated performance of the proposed method.

The situation slightly modified in FIG. 4b differs from the situation in FIG. 4a merely in that one of the containers 01 according to the invention has been removed from the shelf of the sales premises 06 and has been brought into an open position in the area of the service counter or helpdesk 08. Accordingly, in response to receiving a corresponding signal from a sending unit 10 of a combined sending and receiving unit 12, the container 01 being in the open position will generate a response signal by means of the RFID chip attached to it and having a connected near field antenna and will transmit said response signal by means of the near field antenna.

In this case, communication with the sending and/or receiving unit takes place via the near field antenna and not via the far field antenna because in the open position of the container 01 the far field antenna and the near field antenna are so far away from each other that noncontact electromagnetic coupling between the far field antenna and the near field antenna is no longer possible. Hence, the response signal of the container 01 has a second range r2. In method step S4, in which the receipt of a response signal is checked by means of the combined sending and receiving units 12, only the combined sending and receiving unit 12 in the area of the service counter or helpdesk 08 can consequently receive the response signal of the open container 01 and correspondingly issue a positive report about having received the response signal and can transmit said report to the data processing installation 13.

An important advantage of the method according to the invention becomes clear upon comparison of FIGS. 4a and 4b, assuming that FIGS. 4a and 4b illustrate a situation in temporal succession, in which the situation of FIG. 4b happens after situation 4a. From this it follows that when the proposed method is repeatedly performed or applied, at first both receiving units 11 in the ceiling area 09 and the receiving unit 11 in the area of the helpdesk or service counter 08 receive the response signal of the container 01 and then only the last-mentioned receiving unit 11 in the area of the helpdesk or service counter 08 receives the response signal of the container 01. The data processing installation 13 can be programmed to assess such a change in the receipt of response signals as non-critical. In other words, this means that the containers will often be opened by or at least in the presence of accordingly authorized personnel and under their supervision especially in the area of the helpdesk or service counter 08. Consequently, there is no risk that the content of the container 01 can be removed from the container 01 in the open position in order to be stolen.

In very general terms, the change in receipt of the response signal thus allows a conclusion not only regarding the location of the container 01 but also regarding its shut position.

The modified situation illustrated in FIG. 4c basically corresponds to the situation in FIG. 4b. Here, a container 01 has been moved into the area of the cash register 07 and has also been brought into the open position. Processes of this kind are entirely common in the checkout area to ensure or check completeness of the content of the container 01 prior to completion of the sale, for example. In the situation of FIG. 4c, too, the corresponding container 01, in response to a signal, transmits a response signal via merely the near field antenna, said response signal having the reduced range r2, which, in turn, can only be registered by the combined sending and receiving unit 12 in the area of the cash register 07 and can be correspondingly communicated to the data processing installation 13 and be processed there.

As in FIG. 4b, the state of the container 01 in the example of FIG. 4c can be assessed as non-critical if the data processing installation is programmed accordingly since it is common for the container to be opened in the area of the cash register 07 as described before.

While not illustrated in any of FIGS. 4a to 4c, a change in the receiving of response signals, for example, could alternatively be assessed as critical based on the situation of FIG. 4a, wherein subsequently at a certain point in time a response signal will only be registered by the two receiving units 11 in the area of the ceiling 09 of the sales premises 06 and additionally by the receiving unit 11 in the area of the cash register 07, and at an even later point in time a response signal will finally be registered, i.e. received, by the receiving unit 11 arranged in the right-hand area of the ceiling 09 in FIG. 4a and by the receiving unit 11 arranged in the area of the cash register 07. This may indicate that an unopened container 01, i.e. a container in the closed position, is about to be removed from the sales premises 06 for the purpose of theft.

The situation illustrated in FIG. 4d, in which a container 01 is or has been brought into the open position in the area of the shelf of the sales premises 06 and the response signal having the second range r2 can no longer be received by any of the receiving units 11, has to be considered critical, as well. In the two situations mentioned last or during transition into the two situations mentioned last, it may be envisaged for the data processing installation, by way of corresponding programming thereof, to generate a corresponding output at an output unit so as to point out the possibility of theft or of attempted theft.

The invention claimed is:

1. A method for retrieving a shut position and/or a location of at least one closable container, said method comprising the steps:
   a) sending a signal via a first sending unit;
   b) receiving the signal with a near field antenna of the container, said antenna being connected to an RFID chip;
   c) generating a response signal by way of the RFID chip and transmitting the response signal, wherein, in the closed position of the container, a noncontact electromagnetic coupling exists between the near field antenna which is connected to the RFID chip, and which is arranged at the first or at the second container part, and a far field antenna being arranged at the other one of the first and second container part, respectively, and
   wherein the response signal is transmitted with a first range for communicating with a receiving unit and wherein, in the open position of the container, a response signal having a second range is transmitted for communicating with a receiving unit;
   d) monitoring if response signals are received by at least one receiving unit.

2. The method according to claim 1, wherein
the response signals having been generated by the RFID chip are generated as characteristic response signals of a respective container or of at least one respective container type.

3. The method according to claim 1, wherein
the method steps a) -d) are repeated periodically, a temporal change in the response signals being detected by data processing installation at least being connected to a receiving unit.

4. The method according to claim 3, wherein
the data processing installation evaluates the temporal change in the response signals and makes a prognosis regarding the location and/or regarding the shut position of the at least one container for a current and/or a future point in time, based on the evaluation.

5. The method according to claim 4, wherein
the location and/or the shut position of the at least one container are/is output via an output unit of the data processing installation.

6. The method according to claim 1, wherein
the signals are sent and the response signals are received with the aid of at least one combined sending and receiving unit.

* * * * *

UNITED STATES PATENT AND TRADEMARK OFFICE
CERTIFICATE OF CORRECTION

PATENT NO. : 9,922,215 B2
APPLICATION NO. : 15/537157
DATED : March 20, 2018
INVENTOR(S) : Lauri Johannes Huhtasalo et al.

Page 1 of 1

It is certified that error appears in the above-identified patent and that said Letters Patent is hereby corrected as shown below:

In the Claims

Column 10, Claim 3, Lines 30-31, "by data" should be --by a data--.

Signed and Sealed this
Thirty-first Day of July, 2018

Andrei Iancu
*Director of the United States Patent and Trademark Office*